(12) United States Patent
Honkakoski et al.

(10) Patent No.: US 9,301,055 B2
(45) Date of Patent: Mar. 29, 2016

(54) ACOUSTIC ACTUATOR PLATE STRUCTURE

(75) Inventors: Erkki Honkakoski, Sastamala (FI); Antti Kelloniemi, Helsinki (FI); Heini Orhala, Sastamala (FI); Pasi Peltola, Tampere (FI); Sari Tuominen, Suodenniemi (FI)

(73) Assignee: PANPHONICS OY, Espoo (FI)

( * ) Notice: Subject to any disclaimer, the term of this patent is extended or adjusted under 35 U.S.C. 154(b) by 149 days.

(21) Appl. No.: 12/527,246

(22) PCT Filed: Feb. 22, 2008

(86) PCT No.: PCT/FI2008/050084
§ 371 (c)(1),
(2), (4) Date: Sep. 11, 2009

(87) PCT Pub. No.: WO2008/102063
PCT Pub. Date: Aug. 28, 2008

(65) Prior Publication Data
US 2010/0008525 A1    Jan. 14, 2010

(30) Foreign Application Priority Data
Feb. 23, 2007   (FI) ..................... 20070155

(51) Int. Cl.
*H04R 25/00*    (2006.01)
*H04R 19/01*    (2006.01)
(Continued)

(52) U.S. Cl.
CPC  *H04R 19/01* (2013.01); *B32B 7/02* (2013.01); *B32B 27/08* (2013.01); *H04R 19/02* (2013.01)

(58) Field of Classification Search
USPC ........................................ 381/191
See application file for complete search history.

(56) References Cited

U.S. PATENT DOCUMENTS 3,755,043 A    8/1973    Igarashi et al.
4,626,263 A    12/1986   Inoue et al.
(Continued)

FOREIGN PATENT DOCUMENTS

DE    19725253    12/1998
GB    1394347     5/1975
(Continued)

OTHER PUBLICATIONS

International Search Report and Written Opinion for corresponding International Application No. PCT/FI2008/050084 (Jun. 5, 2008).
(Continued)

*Primary Examiner* — Davetta W Goins
*Assistant Examiner* — Amir Etesam
(74) *Attorney, Agent, or Firm* — Marshall, Gerstein & Borun LLP

(57) ABSTRACT

Acoustic actuator plate structures are used in acoustic applications. The acoustic actuator plate structure according to the invention contains an electret material and comprises a structurally weaker electret layer (1), where the specific resistance of the electret material is at least 10 Ωm and the yield point of it is high, and a structurally stronger support structure layer (2), where the plastic region of the support layer material is wider than the plastic region of the electret material. The electret layer (1) can be formed of a material that retains its electret properties extremely well even in high temperatures and humid conditions. This material may be brittle. The support structure layer (2) provides mechanical and structural strength to the acoustic actuator plate structure.

16 Claims, 1 Drawing Sheet

(51) Int. Cl.
  *B32B 7/02*   (2006.01)
  *B32B 27/08*  (2006.01)
  *H04R 19/02*  (2006.01)

(56) References Cited

U.S. PATENT DOCUMENTS

| | | | |
|---|---|---|---|
| 5,583,192 | A | 12/1996 | Bennett et al. |
| 6,489,033 | B1 | 12/2002 | Hatke et al. |
| 6,759,769 | B2* | 7/2004 | Kirjavainen ................ 307/400 |
| 2003/0113546 | A1* | 6/2003 | Cho et al. .................... 428/421 |
| 2004/0113526 | A1* | 6/2004 | Kirjavainen ......... B06B 1/0261 310/328 |
| 2005/0277040 | A1 | 12/2005 | Michel et al. |

FOREIGN PATENT DOCUMENTS

| | | |
|---|---|---|
| JP | 49046426 | 5/1974 |
| JP | 50086125 A | 7/1975 |
| JP | 8041260 | 2/1996 |
| JP | 10272314 | 10/1998 |
| JP | 2004-526384 A | 8/2004 |
| WO | WO-99/56498 A1 | 11/1999 |
| WO | WO-02085065 | 10/2002 |

OTHER PUBLICATIONS

Official Action from Finnish priority application No. FI20070155 (Nov. 1, 2007).

Schwodiauer et al., Low-dielectric-constant cross-linking polymers: Film electrets with excellent charge stability, Appl. Phys. Lett., 75(25): 3998-4000 (1999).

Saarimaki et al., Novel heat durable electromechanical film: Processing for electromechanical and electret applications, IEEE Trans. Dielectrics Electrical Insulation, 13(5):963-72 (2006).

European Extended Search Report from corresponding European application No. 08718537.7, dated Nov. 14, 2011.

English translation of Notice of Reasons for Rejection from corresponding Japanese application No. JP 2009-550739 (dated Jan. 5, 2012).

* cited by examiner

ACOUSTIC ACTUATOR PLATE STRUCTURE

BACKGROUND OF THE INVENTION

The invention relates to an acoustic actuator plate structure comprising an electret layer containing electret material and a support structure layer.

Electret plate structures include plastic films with a permanent or long-lasting electric charge in their plastic material. These electret films are used in acoustic applications, such as microphones and loudspeakers.

The material of electret films may be conventional plastics, such as polycarbonate PC, polyester or polypropene PP. However, the charge of such electret films diminishes quite quickly due to moisture or temperature, for instance.

In polar plastic materials it is possible that the charge field visible outside the film may not only diminish but also change its sign to the opposite, whereby the electric properties of applications do not remain stable even though the charge level remains. The electret properties of electret films made of fluoropolymers, such as polytetrafluoroethylene PTFE, keep quite well even in high temperatures and humid conditions. However, fluoropolymers are quite expensive and their processing is quite difficult, which limits their use in electret films.

Publication U.S. Pat. No. 4,626,263 discloses an electret that contains non-polar polymer and polar polymer and modified non-polar polymer. All the above-mentioned substances are mixed and the mixture is extruded into film, for example. However, the manufacturing process of such an electret is all in all quite complex. In addition, the properties of the electret are not altogether sufficiently good in particular for the most demanding acoustic applications.

Cyclic olefin copolymer COC is well suited as material for electret films, because it keeps its charge quite well and its price is also reasonable. For practical applications of electret films, essential properties also include that cyclic olefin copolymer COC can be metalized easily without pre-treatment to form electrically conductive surfaces and that water penetrates the material poorly. Films made of cyclic olefin copolymers that keep their charge well and endure high temperatures are, however, quite brittle, which limits the use of the material both in manufacturing film and in practical applications.

Publication U.S. Pat. No. 6,489,033 discloses a solution which aims at improving the durability and machinability of cyclic olefin copolymer COC by forming a mixture of cyclic olefin copolymer COC and some other different polyolefin. The mixture is then formed into an electret film. However, doping cyclic olefin copolymer COC or adding additives thereto to reduce the brittleness impairs its ability to keep its charge in practical conditions. Thus, the disclosed solution cannot produce a sufficiently good electret film in particular for the most demanding acoustic applications.

Publication GB 1,394,347 discloses an electret film for use in loudspeakers, earphones or, as biased film, in microphones. This electret film is a two-layer element with polytetrafluoroethylene PTFE or fluoroethylenepropene FEP, for instance, as the electret material. Their yield point is so low that alone they are not suitable for the intended use. Therefore, the publication proposes the use of a support layer with a higher yield point than that of the electret material. The density of materials used as electret materials and having a low yield point is quite high. Thus, the structure has some mass-induced inertia and the resonance frequency of the structure will be quite low. All in all, the energy requirement is quite high especially when producing high frequencies.

BRIEF DESCRIPTION OF THE INVENTION

It is an object of the present invention to provide a novel acoustic actuator plate structure.

The acoustic actuator structure of the invention is characterized in that the specific resistance of the electret material is at least $10^{14}$ ohmmeters, the yield point of the electret material is high, and the plastic region of the material of the support structure layer is wider than that of the electret material.

The idea of the invention is that the acoustic actuator plate structure comprises an electret layer containing electret material and a support structure layer. The specific resistance of the electret material is at least $10^{14}$ ohmmeters. Further, the yield point of the electret material is high. The plastic region of the material of the support structure layer is wider than that of the electret material, that is, the toughness of the support structure layer is higher than that of the electret material. Therefore, the electret material may be brittle and from the manufacturing engineering viewpoint difficult to use as such. The support structure layer reduces the brittleness without lowering the yield point. This way, an acoustic actuator plate structure is produced that keeps the electret properties extremely well even at high temperatures and in moist conditions. The structure is as a whole extremely durable and usable even in demanding acoustic applications. All in all, the solution is simple and easy to manufacture.

The idea of an embodiment is that the electret layer is made of cyclic olefin copolymer COC, whereby the electret properties of the acoustic actuator plate structure are extremely good and its price is also reasonable.

The idea of a second embodiment is that the support structure layer is made of polar plastic, such as polyethyleneterephthalate PET. The electret layer stabilizes with its field the properties of the plastic whose molecular structure is polar. It is then for instance possible to make both outer surfaces of the acoustic actuator plate structure to show charges of the same sign.

The idea of a third embodiment is that the support structure layer is a plastic film and the electret layer is preferably also a film. This type of structure is well suited for use in acoustic applications using a moving film.

BRIEF DESCRIPTION OF THE FIGURES

The invention is described in more detail in the attached drawings in which.

In the figures, some embodiments of the invention are shown simplified for the sake of clarity. Similar parts are marked with the same reference numbers in the figures.

DETAILED DESCRIPTION OF SOME EMBODIMENTS OF THE INVENTION

Figure 1:
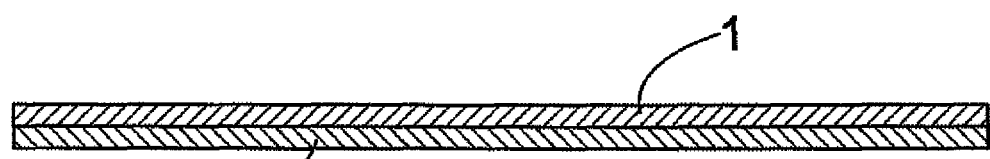
FIG. 1 is a schematic side representation of an acoustic actuator plate structure in cross-section.

FIG. 1 shows an acoustic actuator plate structure with an electret layer 1 and a support structure layer 2 supporting it. The electret layer 1 is made of electret material to which a permanent or long-lasting electric charge can be formed.

The present acoustic actuator plate structure is a structure that is used to detect and/or produce vibration. Thus, the structure is used for instance in loudspeakers to produce sound or in microphones to transform acoustic pressure through vibration into an electric signal, or the structure is employed in acoustic actuators used in sound-absorption. The acoustic actuator plate structure thus needs to endure constant vibration, that is, deformation and bending. In this context, vibration refers to the normal operation of the device when it acts as a vibrator or receiver of vibration. Thus, the deformation and bending remains below the elastic limits of the materials.

The elastic range of a material refers to the range in which the material stretches and returns to its original shape when stresses are removed. In the plastic region, the material stretches, but the piece does not return to its original shape. The yield point is the point between the elastic range and plastic region. When the plastic region is exceeded, the structure of the piece breaks. If the plastic region of a material is narrow, the material is brittle.

The electret properties of the electret material must be as good as possible. Therefore, the specific resistance of the electret material is at least $10^{14}$ ohmmeters. If desired, the electret properties of the electret material can naturally also be defined in some other way, such as by using the inverse of the specific resistance, specific conductance.

Further, the yield point of the electret material is high. The properties of the acoustic actuator plate structure are then extremely good even in demanding acoustic applications. The magnitude of the yield point, that is, the magnitude of the boundary value of the elastic range and plastic region, which is sufficient in a solution of the invention, can be described for instance in such a manner that the yield point of polytetrafluoroethylene PTFE or fluoroethylenepropene FEP is too low, whereas that of cyclic olefin copolymer COC or cyclic olefin polymer COP is sufficiently high.

The plastic region of the material of the support structure layer 2 is wider than that of the electret material. In defining the width of the plastic region, it can be said that the plastic region of polyethyleneterephthalate PET, polyamide PA, polycarbonate PC, polyethylene PE, or polypropene PP, for instance, is sufficiently wide. Instead, the plastic region of cyclic olefin copolymer COC or cyclic olefin polymer COP is not sufficiently wide, and said materials are per se too brittle to provide a good end-result.

The elastic range of the support structure layer 2 should preferably be as linear as possible, and its yield point should be high. The plastic region should be wide so that the manufacture of the acoustic actuator plate structure succeeds relatively easily, and the end-product endures extra momentary deformations that exceed the operating range without breaking during transport and installation.

The electret layer 1 is preferably formed of cyclic olefin copolymer COC that keeps its charge quite well and whose price is quite reasonable. Cyclic olefin copolymer is also easy to metalize without pre-treatment to form electrically conductive surfaces. In addition, water penetrates the material poorly.

The support structure layer 2 is preferably made of a material with a polar molecular structure. A preferable alternative as the material for the support structure layer 2 is polyethyleneterephthalate PET that is an inexpensive plastic with a polar molecular structure, high elastic boundary value and especially a wide plastic region and easy machinability. For instance, cyclic olefin copolymer as the material for the electret layer 1 and polyethyleneterephthalate PET as the material for the support structure layer 2 form together a good entity, because cyclic olefin copolymer retains its positive charge extremely well and stabilizes with its field the properties of polyethyleneterephthalate PET that is polar in its molecular structure. In such a solution, both outer surfaces of the acoustic actuator plate structure can be made to show a positive charge.

The material of the electret layer 1 can also be other than cyclic olefin copolymer COC, for instance cyclic olefin polymer COP or some other suitable material. This material can also be quite brittle, because it is fitted together with the support structure layer 2 to the acoustic actuator plate structure. The material of the support structure layer 2 can be some other polar polymer than polyethyleneterephthalate PET, for instance polycarbonate PC or some other suitable polar polymer. Further, the support structure layer 2 need not necessarily be made of polar polymer, but it can also be made of polyethylene PE, polypropene PP, polyamide PA, or some other suitable material.

Figure 2:
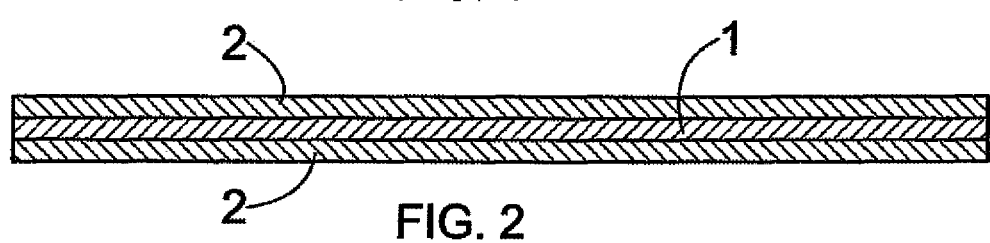
FIG. 2 is a schematic side representation of a second acoustic actuator plate structure in cross-section.

The acoustic actuator plate structure may also be as shown in FIG. 2, wherein the film has three layers, the middle one being the electret layer 1 and both outer layers being support structure layers 2. In this case too, for instance if the electret layer is made of cyclic olefin copolymer COC and the support structure layers 2 are made of polyethyleneterephthalate PET, the outer surfaces of the structure can be made to show electric charges of the same sign.

Figure 3:
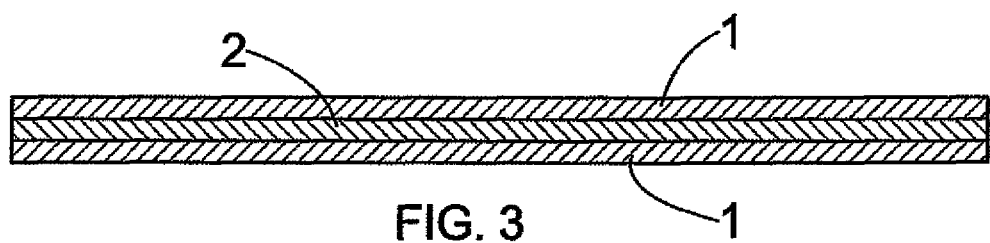
FIG. 3 is a schematic side representation of a third acoustic actuator plate structure in cross-section.

Further, the acoustic actuator plate structure may be as shown in FIG. 3, wherein the middle layer is the support structure layer 2 and it is arranged between electret layers 1. It is also clear that there may be more than two of both the support structure layers 2 and electret layers 1 in the acoustic actuator plate structure. In addition to said layers, the acoustic actuator plate structure may have other layers, such as electrically conductive or adhesive layers.

The electret layer 1 need not necessarily be a film, it may also be a solution, powder, vapour, or fibres that are incorporated on the surface of the support structure layer 2. The support structure layer 2 also need not necessarily be a film, it may be formed of a fibre structure or some other solution suitable for a support structure.

Figure 4:
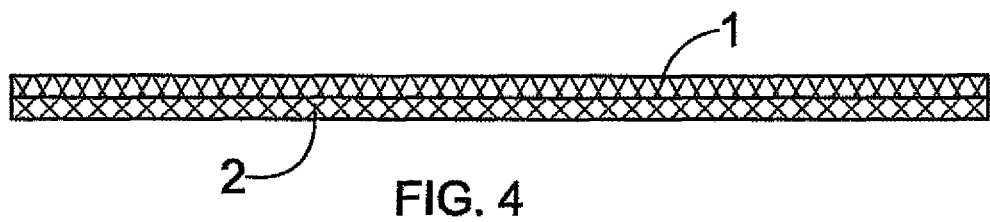
FIG. 4 is a schematic side representation of a fourth acoustic actuator plate structure in cross-section.

FIG. 4 shows an embodiment in which the acoustic actuator plate structure is formed by different fibres. The electret layer 1 of the acoustic actuator plate structure is formed for instance of fibres of cyclic olefin copolymer and the support structure layer 2 in turn is formed of fibres of polyethyleneterephthalate PET. The structure of FIG. 4 may be either air permeable or air impermeable.

The material of the electret layer 1 of the acoustic actuator plate structure may be charged to electret by using a corona discharge, electron bombardment, evaporation, electric field, or some other way known per se. The electret can also be charged during the manufacture of the acoustic actuator plate structure by charging almost melt polymers or loose structures and forming the final structure only after the charging.

The acoustic actuator plate structure can for instance be formed by extruding a two- or multiple-layer plastic film with at least one electret layer 1 and at least one support structure layer 2. The acoustic actuator plate structure can also be formed by extruding a separate film to form the electret layer 1 and a film to form the support structure layer 2 and joining the two films together by gluing, for example. The electret layer 1 and support structure layer 3 then have glue between them, that is, an adhesion material layer. The acoustic actuator plate structure can also be constructed using laminating, spraying and coating methods, for instance.

The acoustic actuator plate structure can be used in acoustic applications, such as microphones or loudspeakers. Further, the acoustic actuator plate structure can be employed in acoustic actuators used in sound-absorption, for instance. The present acoustic actuator plate structure is especially useful even in demanding acoustic applications where the acoustic actuator plate structure needs to deform and move.

The layer thicknesses of the acoustic actuator plate structure depend on the used technique, but the thickness of each layer is preferably less than 200 µm. The surface areas of the acoustic actuator plate structure also depend on the used technique. However, the surface areas may be significantly large, for instance dozens of square centimeters and even larger. The obtained acoustic properties enable the increase of the surface area by multiplying from unit size to the size of entire walls, ceilings, and floors. The size of the basic unit is naturally limited by a sensible transport size.

The material of the electret layer 1 and that of the support structure layer 2 are within the same range in density and yield point. This makes it possible to obtain an advantageous acoustic actuator plate structure as a whole.

In some cases, the features disclosed in this application can be used as such, regardless of the other features. The features disclosed in this application can also be combined as necessary to form different combinations. The interface of the electret layer 1 and support structure layer 2 need not necessarily be clear. Therefore, between the electret layer 1 and support structure layer 2, there may be an intermediate layer with both the support structure layer material and the electret material.

The drawings and the related description are only intended to illustrate the idea of the invention. The invention may vary in detail within the scope of the claims.

The invention claimed is:

1. An acoustic actuator plate structure that has a conductorless multi-layer electret that takes the form of an electret layer and a support structure layer that is connected directly to and moves with the electret layer, the electret layer being made of an electret material and the support structure layer being made of a support structure layer material, wherein:
   a stress-strain curve for the electret material has a plastic region and a stress-strain curve for the support structure layer material also has a plastic region;
   the specific resistance of the electret material is at least $10^{14}$ ohmmeters;
   the yield point of the electret material is not lower than the yield point of cyclic olefin copolymer (COC) and cyclic olefin polymer (COP); and
   the plastic region of the support structure layer material is wider, in terms of % strain on the stress-strain curve, than the plastic region of the electret material.

2. An acoustic actuator plate structure as claimed in claim 1, wherein
   the electret material is formed of cyclic olefin copolymer COC.

3. An acoustic actuator plate structure as claimed in claim 1, wherein
   the support structure layer is formed of a polar plastic.

4. An acoustic actuator plate structure as claimed in claim 3, wherein
   the support structure layer is formed of polyethyleneterephthalate.

5. An acoustic actuator plate structure as claimed in claim 1, wherein
   the support structure layer is a plastic film.

6. An acoustic actuator plate structure as claimed in claim 5, wherein
   the electret material is a film.

7. An acoustic actuator plate structure as claimed in claim 1, wherein
   the electret material comprises a solution, powder, vapour, or fibers that are incorporated on the surface of the support structure layer.

8. An acoustic actuator plate structure as claimed in claim 1, wherein
   the support structure layer is formed of a fiber structure.

9. An acoustic actuator plate structure as claimed in claim 1, wherein
   the acoustic actuator plate structure is air impermeable.

10. An acoustic actuator plate structure as claimed in claim 1, wherein
    the acoustic actuator plate structure is air permeable.

11. An acoustic actuator plate structure as claimed in claim 1, wherein
    the density and yield point of the electret material match those of the support structure layer material.

12. An acoustic actuator plate structure as claimed in claim 2, wherein the support structure layer is formed of a polar plastic.

13. An acoustic actuator plate structure as claimed in claim 12, wherein the support structure layer is formed of polyethyleneterephthalate.

14. An acoustic actuator plate structure that has a conductorless multi-layer electret that has:
    an electret layer that is made from an electret material that has a specific resistance of at least $10^{14}$ ohmmeters and a yield point that at least equals the yield point of cyclic olefin copolymer (COC); and
    a support structure layer to which the electret layer is secured, and that is made of a material that is less brittle than the electret material and carries the same sign of charge as the electret layer.

15. An acoustic actuator plate structure that has a conductorless multi-layer electret that has:
    an electret layer that is made from an electret material that has a specific resistance of at least $10^{14}$ ohmmeters and a yield point that at least equals the yield point of cyclic olefin copolymer (COC) and cyclic olefin polymer (COP); and
    a monolithic support structure layer that is secured to the electret layer with no intervening conductive layer, and is made of a material that is less brittle than COC.

16. An acoustic actuator plate structure as recited in claim 1, in which the support layer structurally supports the electret layer and increases the durability of the structure as a whole.

* * * * *